Patented Mar. 27, 1928.

1,663,733

UNITED STATES PATENT OFFICE.

KURT SCHMIDINGER, OF NEUKOLLN, GERMANY.

METHOD OF MAKING LACQUERS.

No Drawing. Application filed July 1, 1925, Serial No. 40,960, and in Germany May 13, 1925.

My invention relates to a method of making lacquer and it is an object of my invention to provide a method by which a lacquer is obtained without the percentage of acid or saponifiable constituents which is usually found in lacquers and renders them unsuitable for certain purposes, as they destroy certain colours such as luminous colours.

It has often been attempted to make lacquers without the said objectional constituents by eliminating the acid constituents of resins with one- or more- valence alcohols or phenols or by neutralizing the free acid with basic agents. However, all these attempts were failures as all lacquers so made contain a certain though small, percentage, of acid and saponifiable constituents and destroy very delicate colours, as explained above.

I have found that it is possible to obtain a lacquer without the slightest traces of such constituents by dissolving the initial material, which may be any natural or artificial resin, in a suitable solvent and saponifying with a quantity of alcoholic potash slightly in excess of that calculated. The solution so obtained which contains all acid and saponifiable constituents as resin soaps, is diluted with water in a decanter and the watery alcoholic soap solution is separated from the balance of the solution. This latter, after having been thoroughly cleaned, contains the unsaponifiable constituents which are obtained as solids by evaporating the solvent and are treated with one of the usual lacquer solvents to which may be added drying oils and siccative.

*Example.*

Suppose the initial material to be amber colophony. Any suitable quantity of this material is dissolved in benzol and saponified in hot condition with a quantity of alcoholic potash slightly in excess of that calculated. The solution so obtained is diluted with water in a decanter and the alcoholic watery soap solution is separated from the benzol. The separated solution is diluted with water until the last traces of the soap have been eliminated, that is, an emulsion is no longer formed. The obtained benzol solution is then dried with a suitable agent such as chloride of calcium, Glauber salt or the like and then the unsaponifiable percentage of the resin is obtained by evaporating the benzol.

This percentage is boiled with wood oil and siccative and diluting agents are added. In this manner an absolutely enduring lacquer of high quality is obtained which can be used with the most delicate colours without affecting them.

I claim:

Method of making lacquer consisting in dissolving resin in benzol, saponifying the dissolved resin by the use of heated alcholic potash, separating the obtained soap solution from the unsaponifiable constituents dissolved in the first solvent, and obtaining said unsaponified constituents by evaporating the solvent.

In testimony whereof I have signed this specification in the presence of one witness.

KURT SCHMIDINGER.